United States Patent Office 3,055,058
Patented Sept. 25, 1962

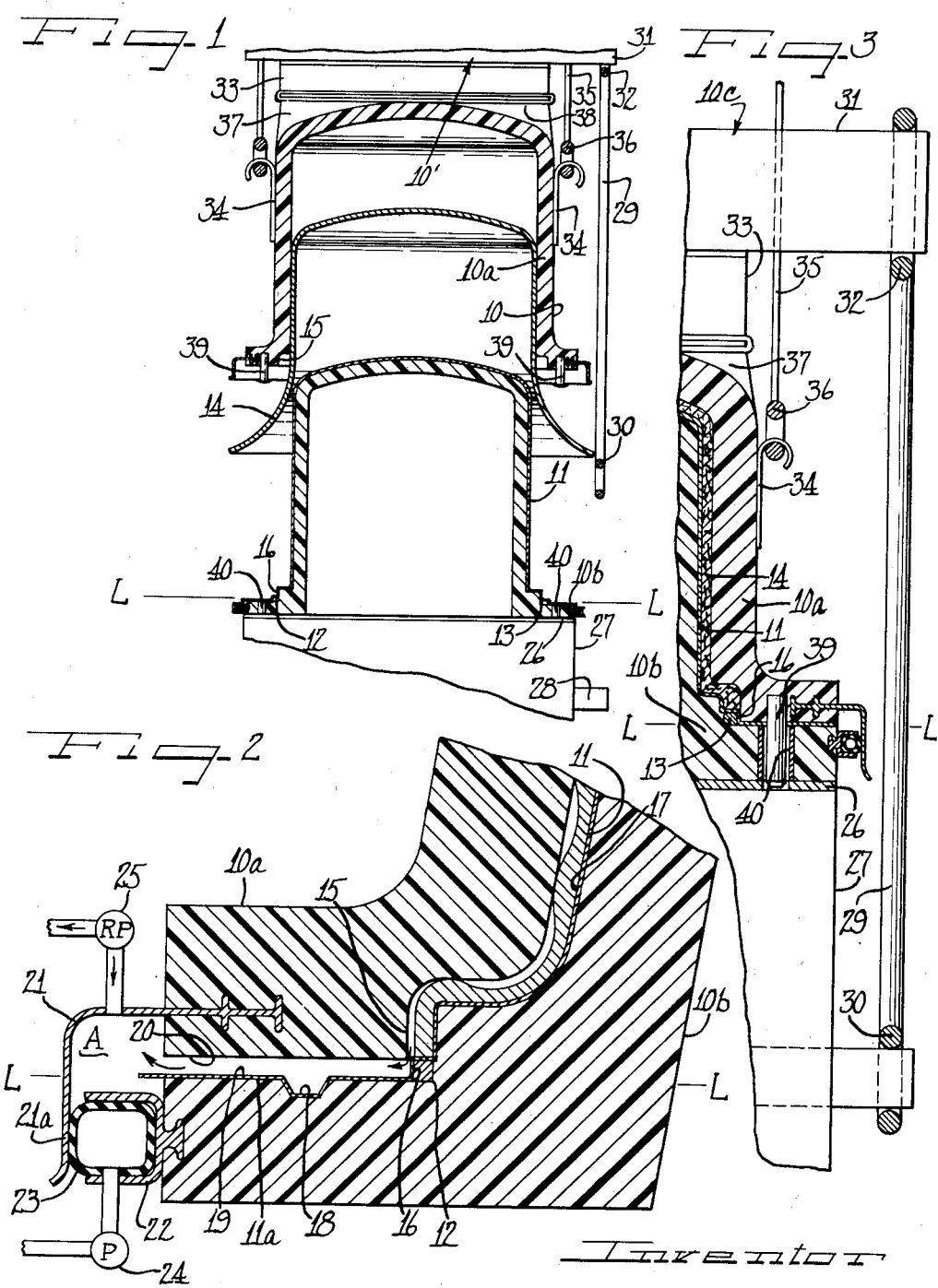

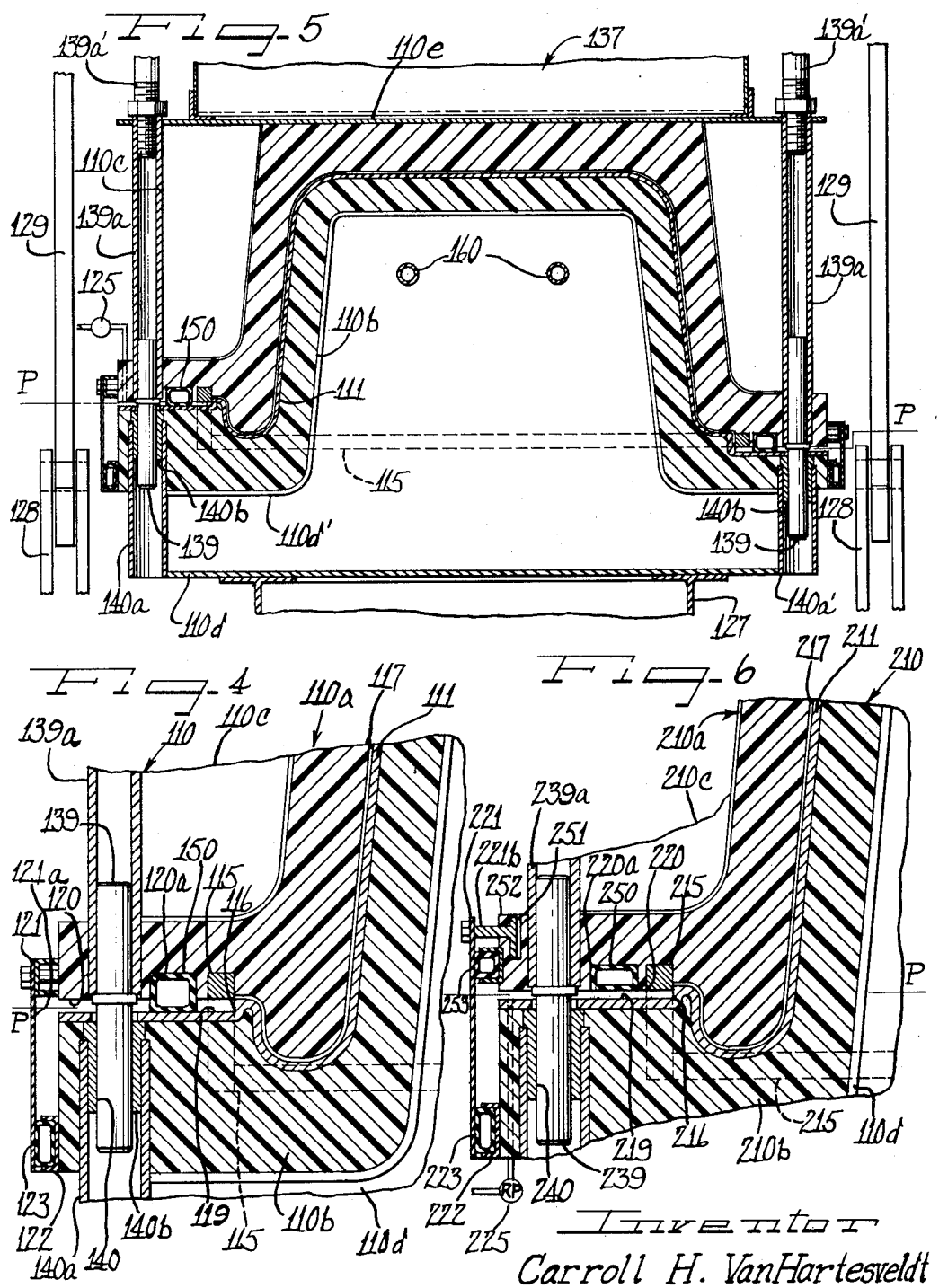

3,055,058
PROCESS FOR MOLDING A GLASS FIBER-POLYESTER RESIN ARTICLE
Carroll H. Van Hartesveldt, 510 Golf View Blvd., Birmingham, Mich.
Filed Mar. 25, 1955, Ser. No. 496,811
6 Claims. (Cl. 18—55)

The instant invention relates to a molding process, and more particularly, to an improved molding process for the fabrication of glass fiber-polyester resin parts or the like.

In recent times, there has developed a very great demand for the glass fiber-polyester resin laminates, which have strength, impact resistance, resilience and relatively light weight. Although these laminates are employed in the form of relatively small articles, their particular structural characteristics are such that they have found extensive use in the fabrication of larger more bulky objects, such as boats, bathtubs, etc. Heretofore, the most effective production method available for the manufacture of these glass fiber-polyester resin laminates involved the use of steam or water heated matched metal dies operated in a hydraulic press. I have now discovered a mold structure employing light-weight cast plastic mold elements which may be used in the formation of these relatively large laminated articles. The previous procedure employed in the art (using matched metal dies) called for an operating pressure of about 200 pounds per square inch on the glass fiber laminate being molded. This pressure was required in order to spread the resin thoroughly through the glass fiber mat, to purge air from the mat ahead of the spreading resin and to compress whatever air is left behind into very small bubbles. This latter requirement has made necessary the use of relatively high molding pressures. On the other hand, it is desirable to employ substantially lower molding pressures using the matched metal dies as well as cast plastic dies, in order to avoid wear and tear on the dies. A problem, which I have also solved concerning the use of light-weight plastic dies is that of separating the dies after molding. The instant invention provides for an improved method of molding employing a reduced pressure. In the instant invention, the mold members are closed upon the composition to be molded, and the cavity retaining this composition is sealed and then evacuated so as to bring the pressure therein to a minimum. This is followed by molding at a pressure sufficient to carry out the molding, but not necessarily at the extremely high pressure heretofore employed for the purpose of compressing the entrapped air into minute bubble form. Finally, pressure is increased between the mold members to separate the same.

It is, therefore, an important object of the instant invention to provide an improved method for compression molding, particularly in the case of the molding of the so-called "low pressure" laminates.

It is another object of the instant invention to provide a hot-press molding process that comprises confining a predetermined amount of a molding composition in substantially the space of the volume thereof, evacuating the space wherein the composition is confined while maintaining the volume of this space substantially constant, and then applying additional molding heat and pressure to the composition.

Other objects, features and advantages of the present invention will become apparent to those skilled in the art from the following detailed disclosure thereof and the drawings attached hereto and made a part hereof.

On the drawings:

FIGURE 1 is essentially an exploded sectional elevational view showing the mold parts and elements in "open" position employed in the molding of an article such as a bathtub;

FIGURE 2 is an enlarged fragmentary detail sectional view of the sealing arrangement employed in the instant device, showing the mold elements in "closed" position;

FIGURE 3 is a fragmentary elevational view showing a second position of the elements of FIGURE 1;

FIGURE 4 is an enlarged fragmentary detail sectional view (comparable to FIGURE 2) of another sealing arrangement employed in the instant device;

FIGURE 5 is essentially a fragmentary sectional elevational view showing mold parts and elements in "closed" position using the embodiment of FIGURE 4; and FIGURE 6 is an enlarged fragmentary detail section view (comparable to FIGURES 2 and 4) of still another sealing arrangement employed in the instant device.

As shown on the drawings:

Referring first to FIGURES 1, 2 and 3, a mold assembly, designated generally by the reference numeral 10, comprises an upper movable molding block or body 10a and a lower stationary molding block or body 10b. The upper molding block 10a is moved upwardly and downwardly by means shown partially at 10c which will be described in detail hereinafter; and such means 10c are also used to exert pressure against the laminate in the mold when the mold assembly is in closed position.

The body 10b is a rigid electrical insulator preferably which may be made out of a number of suitable structural material such as wood, concrete, reinforced plastic or the like which are recognized as being materials having such low coefficients of electrical conductivity that they are, for all practical purposes, "insulators." It will be appreciated that other types of molding dies may be used in the practice of the instant invention, including the matched metal dies of the prior art, although the invention is used most advantageously with the molding blocks 10a and 10b herein described in detail. The instant blocks 10a and 10b are preferably made of metal filled semi-thermal conductive cast epoxy resin (reinforced in the case of dies of this size). Other (filled or unfilled) thermosetting resins may also be used as the principal structural elements, such resins including the phenolic and the polyester resins.

The upper block 10a is made substantially entirely of the cast plastic material, but the lower block 10b comprises a body which is made of the cast plastic material and a thin heat and electrical conductor lining 11, which is preferably a metal such as 18–8 stainless steel (i.e., 18% chromium and 8% nickel stainless steel) or a new "stainless steel" type of metal known as "Thermenol" (80% Fe, 15% Al and 5% Mo or V). The lining 11 is mirror-finished in order to impart a fine finish to the inside (or visible side to the user) of the bathtub which is to be molded. Contact bars 12 and 13 electrically engage opposite sides of the lining 11 along the longitudinal dimensions of the lining 11; and a voltage differential is created across the contacts 12 and 13 when it is desired to heat up the lining and thus heat the resin being molded.

Although the instant method may be used in the molding of any of the commercially available thermosetting synthetic resin molding compositions with only minor operational modifications which are well understood by those skilled in the art, the instant invention preferably employs a thermosetting polyester resin in the molding composition. Also, the filler material used in the preferred composition, which is a laminating composition, is glass fiber.

In connection with the polymerizable polyester resin, it is known generally the polyester resins may be prepared by esterification-condensation of a polybasic acid (preferably a dicarboxylic acid) and a polyhydroxy alcohol (preferably a dihydric alcohol), in the substantial absence of addition polymerization-inducing conditions. As a typical member of the thermosetting polymerizable polyester which may be cured to form a normally rigid thermoset resin, the polyester resulting from each condensation of maleic acid (or anhydride) with ethylene glycol is mentioned. This polyester is generally referred to in the art as "ethylene glycol-maleate," or in the event that a slight amount (i.e. about 10%) of propylene glycol and of phthalic anhydride have also been employed, as is customary in the preparation of laminating resins, the resin is called "ethylene glycol-propylene glycol-phthalate-maleate" and so forth. In general, this polyester is an unsaturated dihydric alcohol-dicarboxylic acid (the unsaturation being furnished by the maleyl radicals therein, which are at least about 60–75 mol percent of the acyl radicals present, the remainder being phthalyl radicals preferably). Often such laminating resins contain a small proportion of a suitably copolymerizable unsaturated monomers such as styrene and diallyl phthalate in order to assist in the cross-linking process during polymerization; but the general characteristics of these "structural" or "laminating" unsaturated polyester resins are those of the true polyester resin system. It has been found to be particularly advantageous to have incorporated in the polyester about 10–25% of a volatile monomer, such as styrene, because this effectively flushes out the fixed gases during evacuation. The resin is first obtained by the formation of long polyester chain-like molecules which are formed by condensation in the absence of addition polymerization and result in molecular chains having a plurality of unsaturated maleyl radicals therein. When such resins are cured, by addition polymerization, the maleyl radicals form cross-links between the chains thus changing the polymer from "linear" to "three-dimensional" and resulting in a rigid thermoset resin.

It has been found, however, that a flexible, substantially thermoset polyester may also be obtained. In this case the polymerizable polyester is substantially saturated instead of being substantially unsaturated, as just described. Such a resin may be an ethylene glycol-phthalate having perhaps 1–10 mol percent and preferably about 2–5 mol percent of the acid radicals as maleyl radicals and the remainder as phthalyl radicals. The "flexible" and the "structural" (or substantially rigid) polyester resins are both commercially available, and are so designated in industry.

In accordance with the procedure of the preferred method, a plurality (preferably only two) glass fiber mats 14 are cut so as to fold over the coated surface of the mold form 10b and to be substantially coextensive therewith. The glass fiber mats 14 are thus formed in the shape of a large rectangle with cuts taken out of the four corners. Such glass fiber mats are commercially available in relatively thin form comprising a great plurality of glass fibers or glass fiber strands heterogeneously arranged in the form of a sheet, but sufficiently entangled with each other to form a generally cohesive or unitary sheet, which may be cut and otherwise handled as a sheet of fabric in many respects. Such glass fiber mats may be pretreated with polyester resin (as indicated in FIGURE 1), or they may be placed upon the mold form 10b and then have the necessary laminating polyester resin poured thereover so as to completely impregnate the mats 14. The amount of such laminating resin ordinarily required to accomplish this may range from about 1 to about 3 times the weight of the mats 14, and is most preferably about twice the weight of the mat. The polyester laminating resin employed for this purpose is the structural or unsaturated laminating resin hereinbefore described. As previously mentioned, the structural or unsaturated polyester resin is a resin which normally forms a rigid thermoset polyester resin upon addition polymerization thereof. It is known that such polyester when hardened is very rigid and perhaps even slightly brittle, if no filler is present therein. The impregnation of finely ground filler particles, or pigment-size particles, does not subtract substantially from the generally rigid nature of such polyester. It has also been found, however, that if certain fillers, namely, an elongated thin rodlike filler material such as glass fibers of substantial lengths, for example, at least an inch or two and preferably of substantially the entire length of the glass fiber mats, is present in a thermoset normally rigid polyester, a certain limited amount of true resiliency is imparted to the body.

In the operation of the instant invention, the mat 14 is thrown over the lining 11 and liquid resin is poured over the top. The upper mold element 10a is then lowered to rest upon the polyester resin covered mat 14. This puts the mold assembly 10 above the "full pressure" position but in substantially "closed" position; with the principal pressure applied to the mat 14 being that of the weight of the upper mold block 10a; and the molding composition (resin covered mat) is confined in substantially the space equal to its volume. Of course, an appreciable amount of air (or the "fixed" or noncondensible gases) will be left in the molding composition or mat 14. At this point, the cutting edge 15 is above the cutting edge 16. As will hereinafter be described, the cavity is then sealed and evacuation is initiated. During evacuation, growing atmospheric pressure tends to urge the upper mold block 10a toward the position shown in FIGURE 2, at which time evacuation is virtually complete; but the cavity volume actually remains substantially constant during this operation because of the rigid molding walls and an actual vacuum is applied to the composition or laminate.

It should be noted that in FIGURE 2 there is just a small opening between the cut-off edges 15 and 16 in the upper mold block 10a and lining 11, respectively, so that the final residue of fixed gases might escape from the cavity proper (indicated generally by the reference numeral 17 in FIGURE 2) and an actual vacuum is created in the cavity. The contiguous faces 19 (on the liner portion 11a) and 20 (on the upper mold block 10a) are also not quite brought to their nearest proximity at this point (although the face 19 may be brought into contact with blocks of the proper thickness positioned on face 20) when pressure is finally applied to the full extent. This permits the final flow of gases from the cavity proper 17 to outside of the mold assembly, as indicated by the arrows; but restricts the flow of liquid resin. The metal lining 11 extends outwardly from beyond the contact bar 12 in a portion indicated by the reference numeral 11a which has a groove there in at 18 to permit the collection of excess resin out of the mold assembly 10 when pressure in finally applied.

As will be appreciated, the contiguous face portions 19 and 20 afford engagement or near-engagement between the mold blocks 10a and 10b and these face portions 19 and 20 are peripherally disposed around the entire cavity 17 (amounting to a peripheral extension thereof) in the general parting line or "plane" L—L between the mold blocks 10a and 10b.

An L-shaped baffle suitably anchored in the plastic body of the upper molding block 10a extends outwardly and downwardly from the periphery of the block 10a adjacent the contiguous faces 19 and 20 and generally normal to the parting plane L—L; and this baffle 21 forms a part of the sealing means here employed. The lower block 10b has a U-shaped channel suitably anchored in the peripheral edge of the block 10b; and this channel 22 opens outwardly (in alignment or parallel to the parting plane L—L) carrying within its mouth or open side an expandable device in the form of a flexible hose which is in communication with the source of fluid under pressure, such as the compressed air pump indicated at 24. The hose 23 is made of rubber or some other suitably resilient material which is capable of expanding (outwardly in the direction of the plane L—L) when loaded with fluid under pressure and which resiliently retracts when the pressure is relieved. As here shown in FIGURE 2, the pressure is applied to the hose 23 causing it to expand outwardly and sealingly engage the depending portion 21a of the bracket or baffle 21.

It will be appreciated that the baffle 21 extends completely around the outer edge of the upper block 10a and the channel 22 carrying the flexible hose 23 extends completely around the outer edge of the lower block member 10b, so that a complete seal may be formed for the cavity 17. The sealing forces thus act in alignment with the plane L—L and do not oppose "closing" movement between the mold blocks 10a and 10b.

As soon as the upper block 10a has been lowered to the "closed" position, the fluid pressure may be applied to the hose 23 (using in the embodiment here described fluid pressures of 5 to 100 pounds gauge per square inch) so as to effectively form a seal with the baffle 21. Then, the cavity 17 and the peripheral chamber A which extends from the baffle 21 inwardly to the cut-off edges 15 and 16 is also evacuated by means of the pump 25 which communicates with the cavity 17 via the chamber A. The vacuum drawn is sufficient to obtain evaporation of a portion of the volatile component in the molding compound (styrene) at the temperature attained by the molding compound at this stage. To provide for this loss, an excess of volatile component or monomer is provided in the molding compound used and the partial pressure of air in the cavity should be reduced at least to about $\frac{1}{3}$ of an atmosphere and preferably at least about $\frac{1}{2}$ pound per square inch absolute. The flexible hose 23 exerts a sufficient amount of pressure against the baffle 21 to prevent appreciable air leakage therebetween and the resilient flexible nature of the hose 23, plus a rather loose fit in the U-shaped channel 22 will permit the hose 23 to effectively retain the vacuum during subsequent downward movement of the baffle 21 with the upper block 10a, when additional molding pressure is ultimately applied. A suitable lubricant applied between the hose 23 and baffle 21 will enhance the seal and decrease wear.

After the vacuum has been drawn in the cavity 17 and the chamber A, then additional pressure may be applied with the required amount of heat to effect curing of the thermosetting composition. Preferably, the additional pressure applied is about from $\frac{1}{2}$ to 5 atmospheres, and most preferably only about 1 atmosphere. This will make the total pressure about 2 atmospheres. The advantages of the instant invention will be appreciated when it is noted that using air at atmospheric pressure, as was the case in the prior art with respect to entrapped air in the mold, a molding pressure of 200 pounds per square inch, or about 13 atmospheres, effects a reduction in the entrapped air bubbles at a ratio of about 13 to 1. In contrast, using the instant method and apparatus the entrapped air, retained in the cavity 17 at the time of molding is under a partial pressure of only $\frac{1}{2}$ pound per square inch absolute and the application of 1 atmosphere of gauge pressure, actually involves the application of an additional 15 pounds per square inch pressure which will effect a compression ratio of 30 to 1. It must be appreciated that this result cannot be obtained unless the cavity volume remains substantially constant and/or the mold walls are rigid so that vacuum of substantial magnitude is actually applied to the molding composition. If, for example, one mold wall is a flexible membrane, then an initial decrease in pressure in the cavity immediately causes collapse of the membrane against the composition to equalize the pressure and again apply atmospheric pressure to the composition. The cavity volume is decreased proportionately and no real purging of the vapor in the cavity takes place. I have found that purging by the volatile resin component successfully removes the air. Vapor from the volatile component will recondense upon application of the final pressure. It is thus possible to employ only a total of 2 atmospheres molding pressure in order to obtain a greater compression ratio than was employed in the prior art using as much as 200 pounds per square inch molding pressure. It will, of course, be appreciated that greater molding pressures can be used in the practice of the instant invention and such greater molding pressures will necessarily result in still greater compression ratios. The advantages of the invention are thus two-fold in this respect in that much greater compression can be effected, if such is desired; and much lower operating pressures may be employed to obtain compression ratios equivalent to those of the prior art, thus avoiding wear and tear on the molding elements.

Referring now to the carriage mechanism indicated generally by the reference numeral 10', which is shown in some detail in FIGURE 3, it will be noted that FIGURE 3 shows the right hand side of the mold assembly of FIGURE 1 in closed position. The bottom mold member 10b has a flat base portion 26 supporting the mold member 10b from beneath and the base portion 26 is suitably affixed to a fixed mounting block 27, which may be formed of concrete or some other conveniently sturdy material and which supports the lower mold form 10b maintaining the same in a generally horizontal plane. A linking post 28 is embedded in the mounting means 27 and extends outwardly from one wall thereof to engage detachably a linking arm 29. At the lower end of the linking arm 29 a suitably detachable means 30 is provided, in this case, in the form of a ring which slips over the linking post 28. Other detachable linking means may be used in place of the elements 28 and 30. The linking arms 29 are carried by a beam 31, being attached at their upper ends by suitable means such as the ring 32, and the arms 29 extend downwardly on either side of the mold 10. The beam 31 is made of suitable structural material such as wood or metal beams and it is adapted to ride on a platen 33 during its movement. During movement upwardly and downwardly of the beam 31, the linking arm 29 is, of course, detached so that the linking post 28 will not prevent movement of the beam 31. The upper mold form 10a is suitably equipped with looped hangers 34 which receive the downwardly extending cables 35 suitably attached to lifting means (not shown) which is a lightweight moving device such as an electric hoist. The cables 35 carry at their depending ends suitable engaging means for the hangers 34, such as rings 36. The cables 35 thus provide for movement of the mold form 10a with the lower platen 37, a resilient bag 38, the platen 33 and the beam 31. In ordinary movement of the form 10a, the total weight of the moving assembly is borne by the cables 35. However, when the mold form 10a is brought to rest upon the mat 14 covering the lining 11, the cables 35 no longer carry weight. The upper platen 33 is secured to the bottom of the beam 31 and the lower platen 37 is rigidly secured to the top of the mold form 10a. These platens 33 and 37 present substantially parallel horizontal faces (of substantially the area of the mat 14 in top plan view) which have positioned therebetween fluid pressure actuated means in the form of the diaphragm 38. The diaphragm 38 is a suitably flexible (rubber) bag or diaphragm which is connected to a source of fluid under pressure (not shown).

In the operation of the instant device, after the mat 14 has been placed upon the lining 11, the mold form 10a is lowered until it comes to rest upon the mat 14. In so lowering the top mold form 10a, guide pins carried by the top mold form 10a and designated by the reference numeral 39 are caused to be inserted into guide apertures in the base of the lower mold form 10b. The guide aperture shown in FIGURE 3 is designated by the reference numeral 40, and these guide apertures 40 and guide pins 39 have very close tolerances, because the guide pins are employed to insure the very close spacing of the cut off edges 15 and 16. Preferably the guide pins 39 and apertures 40 are tied directly into steel reinforcements in the plastic to assure consistent alignment therebetween.

After the guide pins have been suitably inserted in the guide apertures 40, the assembly moves down to bring the mold form 10a to rest upon the mat 14, and the detachable linking arms 29 are put in position so as to form a secure link between the beam 31 and the linking posts 28, thereby preventing upward movement of the beam 31. After the vacuum has been drawn in the cavity and the application of pressure is required, then the source of fluid under pressure is opened into the diaphragm 38 and relatively low pressures of ½ to 5 atmospheres may be employed in the diaphragm 38. The diaphragm 38 working against the firmly secured upper platen 33 urges the lower platen 37 and the mold form 10a affixed thereto downwardly to apply the desired pressure to the mat 14 in the cavity.

A number of unique advantages are obtained in the practice of the instant invention. For example, because of the lower operating pressures allowed by the instant invention (employing evacuating means) the extremely heavy conventional hydraulic press heretofore employed to obtain the high pressures of 200 pounds per square inch may now be dispensed with. A relatively lightweight electric hoist may effectively operate to move the assembly up and down. The lower total force applied against the mold form 10a might in some cases result in a certain amount of side thrust (because of irregularities in the thicknesses of the mat and resin), but the lower total force applied results in a relatively low side thrust, and the guide pins 39 embedded in the reinforced plastic bodies are sufficient to register one mold form in closing alignment with the other.

Because of the use of relatively light-weight mold forms 10a and 10b, plus the unique metal liner 11 as a heating means, the use of lower external forces applied to the mold is desirable; and such lower external forces can be applied with the inflatable bag or diaphragm 38 pressing against the rectangular platen 37 and against the upper platen 33 which is effectively secured to the supporting base 27 (by means of the linking arms 29). The detachable linking arms, of course, permit quick assembly and disassembly of the mold elements in closed position. Moreover, the upper mold form 10a, and platens 33 and 37 and the linking arm assemblies are all relatively light, and they may be hoisted up and down by a simple economical electrical hoist. Also, such electrical hoist is particularly effective in hoisting the movable members to a sufficient height to provide ample room for applying the glass fiber mat 14 to the lining 11 and removing the resulting laminate therefrom. Access to the lining 11 is thus greatly facilitated by this inexpensive expedient and also the various other paraphernalia ordinarily associated with the hydraulic press, such as the four posts which carry the upper platen, are not required in the instant device.

Although the foregoing advantages are of extreme significance in the instant molding art, the use of the instant light-weight equipment leads to another complication which has been solved herein. In the use of hydraulically operated matched metal dies the hydraulic forces applied to effect the relatively high pressure molding may also be reversed so as to effect very great separating forces between the dies. In the molding of relatively large articles having substantial surface areas the adherence between the mold itself and the dies or molding blocks becomes a rather substantial force. It is another important aspect of the instant invention to provide an answer to this problem and this is provided by the use of the pressure control means or pump 25 (FIGURE 2) which is a reversible pump acting between the contiguous faces 19 and 20 to selectively supply fluid pressure therebetween to urge the mold members 10a and 10b apart and to draw vacuum between the contiguous faces 19 and 20 to evacuate the cavity 17. In the operation of the instant device, after the molding cycle has been completed and the pressure in the diaphragm 38 has been relieved, the pump 25 is reversed and fluid pressure is applied to the peripheral chamber A. The sealing hose 23 cooperates with the baffle portion 21a to permit the creation of a pressure differential between the atmosphere and the chamber A; and in this case, a greater pressure is created in the chamber A and this greater air pressure which may be as much as 4 or 5 atmospheres (gauge) is then applied against the entire surface area of the phase portion 20 as a lifting force. In this manner, a lifting force of several tons magnitude may be obtained. A further advantage of particular significance is that the lifting force is applied to the contiguous face portions 19 and 20 in the immediate region of the guide pins 39 and apertures 40, so that the lifting force is in longitudinal alignment with the guide pins and has no tendency to urge the guide pins 39 out of alignment with the apertures 40. The application of the lifting force surroundingly of the guide pins 39 affords maximum mechanical advantage, since any lifting force immediately adjacent the guide pins 39 may be concentrated substantially entirely in the form of a longitudinally aligned lifting force with no lateral components with respect to the pins 39.

In summary of this feature, it will be noted that the baffle means 21a are aligned generally normal to the parting plane L—L and the expandable hose 23 is mounted for expansion in alignment with the plane L—L, so that sealing is effected without the provision of any forces which resist closing movement between the blocks 10a and 10b. The initial application of vacuum between the contiguous faces 19 and 20 by the operation of the pump 25 further assists in applying closing forces to the blocks 10a and 10b. Such forces are also applied in substantial longitudinal alignment with respect to the pins 39. Such forces assist rather than oppose the application of molding pressure via the diaphragm 38. Once the molding pressure has been applied through the diaphragm 38 and the molding cycle has been completed, the pressure in the diaphragm 38 is relieved. At this point, the ordinary light-weight hoist equipment which is used preferably in the practice of the instant invention would be strained in attempting to separate the mold blocks 10a and 10b, so pressure is reversed between the contiguous faces 19 and 20 by the pump 25 and the instant lifting forces are applied in substantial alignment with the pins 39. Also, the application of pressure between the contiguous faces 19 and 20 serves to eliminate any "suction effect" between the laminate and the mold members 10a and 10b which might resist opening of the mold.

Another aspect of the instant invention resides in the discovery that, by the use of carefully controlled molding techniques, it may not be necessary to draw a vacuum between the contiguous face portions 19 and 20 for purposes of evacuating the cavity before the application of molding pressure. By controlled application of the molding pressure through the diaphragm 38, it is sometimes possible to remove a sufficient amount of entrapped air or other non-condensible gases so as to obtain a product of reasonably good quality. This, however, does not eliminate the problem of opening the mold. Lifting pressures for the purpose of opening the mold can, of course, be applied using the arrangement shown in FIGURE 2, without the necessity of initially drawing the vacuum in chamber A, as hereinbefore described; but certain other devices have also been found to be unusually advantageous for this purpose.

Referring now to FIGURE 4, it will be noted that each element shown in FIGURE 4 which is the same functionally as an element shown in FIGURES 1, 2 and 3 is given a reference numeral of 100 plus the reference numeral employed in FIGURES 1, 2 and 3. In FIGURE 4, the molding blocks 110a and 110b of the mold assembly 110 are shown in a view exposing an upper metal reinforcing sheet 110c in the upper block member 110a and a lower metal reinforcing sheet 110d in the lower block 110b. As is also shown in FIGURE 5, the upper reinforcing sheet member 110c extends substantially the full height of the mold 110 (and there are a number of such sheet members) and each of the steel reinforcing members 110c is secured to a generally horizontal top plate 110e (FIG. 5) and extends downwardly therefrom along the side of the mold 10 to reinforce the plastic block proper 110a and to fix the position of a guide pin shaft 139a for a guide pin 139 seated therein. The lower reinforcing steel member 110d in the block 110b also extends the full width of the mold 110 reinforcing the resin proper 110b and engaging a hollow metal guide member 140a which in turn mounts a sleeve 140b defining the guide pin aperture 140 receiving the guide pin 139. This is pointed out merely to show the relationship between the metal reinforcing members 110c and 110d and the guide pin 139 and the guide pin aperture 140. It will also be noted that the shape of the molding blocks 110a and 110b is different from that shown in FIGURE 2 in that the showing in FIGURE 4 is of a mold portion which defines the rounded outer edge of a bathtub. The electrical conductor lining 111 shown in FIGURE 4 is also made of stainless steel and functions in the same manner as the lining 11 of FIGURE 2. A cut-off block or bar 115 is mounted in the upper block 110a and cooperates with an edge 116 on the stainless steel lining to carry out the cut-off function hereinbefore described. The cut-off bar 115, of course, extends around the entire periphery of the mold assembly 110 and is shown partially in dotted lines in FIGURES 4 and 5.

A baffle 121 suitably anchored in the plastic body of the upper molding block 110a extends outwardly and downwardly from the periphery of the block 110a adjacent contiguous face portions 119 and 120 on the lower block 110b and the upper block 110a, respectively. The contiguous face portions 120 and 119 lie generally in a parting plane P—P between the blocks 110a and 110b and the depending portion 121a of the baffle 121 extends through the plane P—P and perpendicular thereto. The lower block 110b has a U-shaped channel 122 suitably anchored in the peripheral edge of the block; and this channel 122 opens outwardly in alignment with the parting plane P—P carrying within its mouth or open side an expandable device in the form of a flexible hose 123 which is in communication with the source of fluid under pressure (not shown) and which is expandable so as to make sealing engagement with the depending portion of the baffle 121a, in the manner hereinbefore described.

An additional feature is provided in the device shown in FIGURE 4, in that the upper rigid face portion 120 is provided with a peripheral groove 120a in which is seated an expandable hose 150 also attached to a source of fluid under pressure (not shown). As shown in FIGURE 4, the expandable hose 150 is in expanded position and it is urging the upper block 110a upwardly so as to open the mold. The expandable hose 150, thus functions in a direction primarily perpendicular to the parting plane P—P. The hose 150 is disposed between the rigid faces 119 and 120 and is expandable to separate such faces and the molding blocks carried thereby. The hose 150 is made of relatively strong material so that it can hold under relatively high fluid pressures. The lifting force applied by expanding the hose 150 is applied against a relatively small area of the faces 119 and 120 (as compared to the lifting force applied using the device of FIGURE 2 hereinbefore described), but the sealing cooperation between the baffle 121a and the sealing hose 123 will not permit the application of as great a lifting pressure in pounds per square inch as will the relatively sturdy expandable hose member 150. Also, the expandable hose member 150 may be used in a molding operation wherein no sealing is required between the baffle 121 and the sealing hose 123 (in operations hereinbefore described) and in such case, the only device available for lifting pressure is the hose 150. It will be appreciated that both lifting devices may be used in combination, if such is desired.

Referring briefly to FIGURE 6, it will be noted that the 200 series of reference numerals is used to indicate elements which are the same or substantially the same as those shown in the 100 series reference numerals of FIGURE 4. In FIGURE 6, the expandable "lifting" hose 250 is shown in collapsed position, so that it is apparent that this hose in collapsed position does not interfere with the closing movement between the rigid faces 219 and 220 on the blocks 210b and 210a of the mold assembly 210. In FIGURE 6, however, the baffle assembly 221 is somewhat different. At the lower end of the baffle assembly 221 the previously described U-shaped bracket 222 carries the previously described sealing hose 223, but at the upper end of the bracket 221 a bracket anchoring member 221b is retained within the resinous block 210a in an oversize chamber 251, which permits expansion and contraction of the plastic block member 210a without applying any strain to the baffle anchoring member 221b, which is made of metal. The limited relative movement between the baffle 221 and the block 210a is thus provided by the oversize retaining chamber 251, and a plurality of anchoring means 221b may be positioned around the periphery of the block 210a. Since these anchoring members 221b do not effectively form an air seal between the baffle 221 and the upper block 210a a second U-shaped bracket 252 is mounted in the peripheral edge of the block 210a and carries therein an outwardly expandable sealing hose 253 which functions in the same manner as the hose 223 to sealingly engage the baffle 221 and thereby effectively air-seal the cavity 217.

It will further be noted that the contracted position of the hose 250 in FIGURE 6 permits the pump 225 to evacuate the entire cavity 217 while the sealing means 223 and 253 cooperate with the baffle 221 to seal the cavity. When the molding cycle is over, the sealing means 223 and/or 253 may be released so as to obtain substantially atmospheric pressure in the cavity 217 and pressure can be applied to the lifting hose 250 (so as to afford a lifting force aligned with the longitudinal dimension of the guide pins 239); or the sealing means 223 and 253 can be retained in effective operating position and the reversible pump 225 can be used to create lifting pressure within the cavity 217, with or without the additional lifting pressure which will be applied by the hose 250.

Referring briefly to FIGURE 5, which merely shows various additional elements associated with the embodiment shown in FIGURE 4 so as to make a view comparable to that shown in FIGURE 3. It will be seen that the bottom metal reinforcing member 110b is suitably mounted on a fixed mounting block 127. There are a plurality of reinforcing members 110d which are positioned in longitudinally spaced alignment and retained in position by guide rods 160, 160 extending therethrough. The plastic body 110b of the lower molding block is secured to a flange portion 110'd running along the top of each of the reinforcing members 110d and the metal lining 111 lies over the top of the plastic block 110b. On opposite sides or ends of the reinforcing member 110d there are mounted guide sleeve posts 140a which receive and mount the guide sleeves 140b, which in turn receive the guide pins 139 in closed position. The guide pins 139 are carried in the guide posts 139a which are in turn secured to the side reinforcing members 110c, 110c on opposite sides. The side reinforcing members 110c, 110c merge into the top reinforcing plate 110e which maintains successive pairs of side reinforcing members 110c, 110c in longitudinally spaced relationship and which serves also to function as a platen 137 (comparable to the platen 37 of FIGURE 3). The structure of the overhead carrying means is not shown in FIGURE 5, but this structure is substantially the same as that indicated in FIGURE 3, in that a large diaphragm comparable to the diaphragm 38 of FIGURE 3 is adapted to cooperate with the platen 137 to urge the top mold member 110a downwardly when linking arms 129, 129 (comparable to the arms 29 of FIGURE 3) have been moved into locking engagement with the posts 128, 128 (comparable to the posts 28 of FIGURE 3). The general symmetry of the showing in FIGURE 5 serves to emphasize the fact that all lifting forces are applied closely adjacent to the guide pins 139 in longitudinal alignment therewith and in a direction substantially normal to the parting plane P—P, whether such lifting forces be applied through the high pressure hose 150, or through a reversible pump 125 or both (in the manner hereinbefore described). It will also be noted that the upper extensions 139'a, 139'a of the guide pin posts 139a, 139a are suitably connected to cable means (not shown) so as to carry out the function of the members 34, 35 and 36 of FIGURE 3.

This is a continuation-in-part of my copending application Serial No. 408,889, filed February 8, 1954, now Patent No. 2,841,823.

It will be understood that modifications and variations may be effected without departing from the scope of the novel concepts of the present invention.

I claim as my invention:

1. A low pressure laminating process that comprises impregnating glass fibers with polymerizable unsaturated polyester resin and a copolymerizable monomer, confining the impregnated glass fibers between rigid mold members in a volume larger than the final molded volume, evacuating the thus confined impregnated glass fibers at an elevated temperature to remove entrapped non-condensable gases by purging the mold with evaporated monomer, and applying molding heat and pressure to the evacuated impregnated glass fibers to reduce the same to final molded volume.

2. A hot-press molding process that comprises closing to nearly closed position a mold cavity containing glass fibers impregnated with polymerizable unsaturated polyester resin and a copolymerizable monomer, sealing the cavity to prevent gases from entering the same, reducing pressure in the cavity to below atmospheric pressure while maintaining the cavity volume constant so as to purge air out of the cavity with evaporated monomer, and then completely closing the mold by applying molding heat and pressure in excess of atmospheric pressure to the resin impregnated fibers in the cavity.

3. A process as claimed in claim 1 wherein the monomer incorporated in the polyester is styrene and it is incorporated in an amount within the range of 10 to 25% of the weight of the polyester.

4. A process as claimed in claim 3 wherein the evacuation of the impregnated glass fibers is carried out to obtain therein one-fifth of absolute atmospheric pressure.

5. A process as claimed in claim 2 wherein the monomer incorporated in the polyester is styrene and it is incorporated in an amount within the range of 10 to 25% by weight of the polyester.

6. A process as claimed in claim 5 wherein the step of reducing pressure in the sealed cavity is carried out to obtain therein one-fifth of absolute atmospheric pressure.

References Cited in the file of this patent

UNITED STATES PATENTS

| | | |
|---|---|---|
| 1,190,072 | Aiken | July 4, 1916 |
| 2,370,322 | Nebesar | Feb. 27, 1945 |
| 2,411,043 | Klassen | Nov. 12, 1946 |
| 2,422,979 | Pecker | June 24, 1947 |
| 2,478,165 | Collins | Aug. 2, 1949 |
| 2,512,535 | Wiltshire et al. | June 20, 1950 |
| 2,575,734 | Schulman | Nov. 20, 1951 |
| 2,613,397 | Borkland | Oct. 14, 1952 |
| 2,668,328 | Porter | Feb. 9, 1954 |